(12) United States Patent
Jiang et al.

(10) Patent No.: US 11,988,632 B1
(45) Date of Patent: May 21, 2024

(54) SYSTEMS FOR CONTINUOUS SCANNING MONITORING AND ANALYSIS BASED ON DISCRETE THREE-DIMENSIONAL FLUORESCENCE TECHNOLOGY

(71) Applicant: SUZHOU HELMEN PRECISION INSTRUMENTS CO., LTD., Jiangsu (CN)

(72) Inventors: Kai Jiang, Suzhou (CN); Ping Wang, Suzhou (CN); Yawei Tang, Suzhou (CN); Tao Zhang, Suzhou (CN)

(73) Assignee: SUZHOU HELMEN PRECISION INSTRUMENTS CO., LTD., Suzhou (CN)

( * ) Notice: Subject to any disclaimer, the term of this patent is extended or adjusted under 35 U.S.C. 154(b) by 0 days.

(21) Appl. No.: 18/404,846

(22) Filed: Jan. 4, 2024

(30) Foreign Application Priority Data

Jan. 5, 2023 (CN) .......................... 202310012417.9

(51) Int. Cl.
*G01N 27/44* (2006.01)
*G01N 27/447* (2006.01)

(52) U.S. Cl.
CPC .............................. *G01N 27/44721* (2013.01)

(58) Field of Classification Search
CPC ................................................ G01N 27/44721
See application file for complete search history.

(56) References Cited

U.S. PATENT DOCUMENTS

2002/0113213 A1* 8/2002 Amirkhanian ... G01N 27/44782
250/458.1

2021/0262980 A1 8/2021 Takahashi et al.
2022/0334055 A1 10/2022 Wang

FOREIGN PATENT DOCUMENTS

| CN | 1896723 | A | 1/2007 |
|---|---|---|---|
| CN | 1318847 | C | 5/2007 |
| CN | 101464411 | A | 6/2009 |
| CN | 107576639 | A | 1/2018 |
| CN | 111337562 | A | 6/2020 |
| CN | 111830002 | A | 10/2020 |

OTHER PUBLICATIONS

First Office Action in Chinese Application No. 202310012417.9 mailed on Mar. 9, 2023, 14 pages.
Notification to Grant Patent Right for Invention in Chinese Application No. 202310012417.9 mailed on Apr. 9, 2023, 5 pages.

* cited by examiner

*Primary Examiner* — Jamil Ahmed
(74) *Attorney, Agent, or Firm* — Porus IP LLC

(57) ABSTRACT

Embodiments of the present disclosure provide a system for continuous scanning monitoring and analysis based on a discrete three-dimensional fluorescence technology. The system comprises a high-pressure capillary gel electrophoresis mechanism configured to enable passages of different lengths of STR sequence fragments and nucleic acid gene fragments in an energized state; a sampling window unit configured to assemble a plurality of capillary tubes and a plurality of detection optical fibers shared by an excitation light and excited light; and a detection window unit configured to assemble the plurality of detection optical fibers and a fluorescence signal detection unit. The fluorescence signal detection unit is configured to output a plurality of single excitation light sources and obtain fluorescence signals.

7 Claims, 6 Drawing Sheets

SYSTEMS FOR CONTINUOUS SCANNING MONITORING AND ANALYSIS BASED ON DISCRETE THREE-DIMENSIONAL FLUORESCENCE TECHNOLOGY

CROSS-REFERENCE TO RELATED APPLICATIONS

The present disclosure claims priority of the Chinese Patent Application No. 202310012417.9, filed on Jan. 5, 2023, the entire content of which is hereby incorporated by reference.

TECHNICAL FIELD

The present disclosure relates to the field of measurement/testing technology, and in particular to a system for continuous scanning monitoring and analysis based on a discrete three-dimensional fluorescence technology.

BACKGROUND

Microsatellite DNA sequences refer to a Short Tandem Repeat (STR) with a core sequence of 2 to 6 bases. Due to the high polymorphism caused by differences in DNA fragment length or DNA sequence between individuals, STR is inherited in a Mendelian co-dominant manner during gene transmission and is called DNA fingerprint because of its short gene fragments, high amplification efficiency, and accurate discrimination, etc. STR is widely used in the fields of criminal case detection and paternity testing. Furthermore, when Microsatellite Instability (MSI) occurs, it generally indicates the presence of Mismatch Repair Deficiency (dMMR), which is closely associated with tumorigenesis. As the world's first pan-cancer molecular marker, MSI is currently recommended for screening Lynch syndrome, molecular subtyping of cancer, prognostic assessment, prediction of chemotherapy response, and guidance for PD-1/PD-L1 immunotherapy in all solid tumor patients by numerous authoritative domestic and international guidelines.

Currently, the detection of STR sequences is commonly performed using a DNA gene analyzer. Sample collection and amplification are achieved through Polymerase Chain Reaction (PCR), followed by separation of DNA molecules using thin-layer polyacrylamide gel electrophoresis driven by high pressure. Different nucleic acid sequences are labeled with multi-color fluorescent markers. The gene analyzer reads different fluorescence signals, records the time sequences through the fluorescent window, and calculates the lengths of the tested samples sequences or microsatellite sequences. The gene analyzer, combining the high efficiency of capillary tubes electrophoresis with the high sensitivity of fluorescence detection, is suitable for high-precision specific analysis of trace samples. The gene analyzer based on capillary tube electrophoresis mainly consists of a capillary tube, an excitation light source, a multi-channel spectrometer, a high-precision charge-coupled device (CCD) array detection sensor, a high-voltage module, an automatic reagent filling system, an automatic sample injection system, an algorithmic analysis module, etc. The excitation light source may excite a fluorescence signal by irradiating a transparent window of the capillary tube, and the fluorescence on each capillary tube may be dispersed into a line spectrum according to the wavelength through a plane grating. Fluorescence signals of a plurality of capillary tubes may form a plane array spectrum, and a plane array CCD may record a light intensity signal. An X-axis direction of the plane array CCD represents the fluorescence at different wavelengths, and a Y-axis direction of the plane array CCD represents spatial positions of the plurality of capillary tubes. An intensity of the light intensity signal is a fluorescence intensity, which represents an abundance of a target STR genotype of the DNA sample.

However, the sensitivity of the gene analyzer has always been highly dependent on the high abundance products of the PCR amplified sequences of the samples, and there is a serious lack of detection sensitivity for low-copy number sequences. Two technical difficulties may be provided below.

(1) Due to the phenomenon of spectral aliasing between multi-color fluorescence, the excited fluorescence may only be spectrally separated by a grating without the use of a filter. Fluorescence signals are generally broad-spectrum signals with a peak width of more than 50 nm. Accordingly, when STR loci of a same sequence length pass through detection windows of the plurality of capillary tubes, and the plane array CCD detects multi-wavelength fluorescence signals in the X-axis direction, the multi-fluorescence signals may alias, and weak fluorescence signals may be buried in fluorescence tails of strong signals, resulting in detection errors.

(2) There is fluorescence signal aliasing interference in the spatial positions of multi-channel capillary tubes. As a single excitation light source enters from one side of a capillary tube array and penetrates through all capillary tube channels, the excitation intensity of the single excitation light sources inevitably decays stepwise, and the more capillary tube channels, the more severe the decay. The fluorescence signals excited by each of the plurality of capillary tubes may be received by plane array CCD pixel sensors corresponding to neighboring capillary tubes, resulting in spatial misalignment and introducing the detection errors.

Therefore, it is desirable to provide a system for continuous scanning monitoring and analysis based on a discrete three-dimensional fluorescence technology, which may effectively solve the detection errors caused by aliasing of the fluorescence signals.

SUMMARY

One or more embodiments of the present disclosure provide a system for continuous scanning monitoring and analysis based on a discrete three-dimensional fluorescence technology. The system may comprise a high-pressure capillary gel electrophoresis mechanism including a plurality of capillary tubes. The plurality of capillary tubes may be configured to enable passages of different lengths of STR sequence fragments and nucleic acid gene fragments in an energized state. In some embodiments, the system may further include a detection mechanism configured to be cooperated with the plurality of capillary tubes. The detection mechanism may include a sampling window unit configured to assemble the plurality of capillary tubes and a plurality of detection optical fibers; and a detection window unit configured to assemble the plurality of detection optical fibers and a fluorescence signal detection unit. The fluorescence signal detection unit may be configured to output a plurality of single excitation light sources and obtain fluorescence signals.

The plurality of detection optical fibers may be cooperated with the sampling window unit and the detection window unit. The plurality of detection optical fibers may be shared by the excitation light and excited light.

In some embodiments, the sampling window unit may include fixators for fixing the plurality of capillary tubes, and a unique detection optical fiber correspondingly provided at a fixed window position of any one of the plurality of capillary tubes. A light blocking plate may be provided on the fixator between two adjacent capillary tubes.

In some embodiments, each of the plurality of fixators may include a columnar fixator. The plurality of capillary tubes may be attached to an outer periphery of the columnar fixator along an elongation direction of the columnar fixator.

In some embodiments, each of the plurality of fixators may further include a planar fixator. A plurality of grooves may be provided on the planar fixator. Each of the plurality of capillary tubes may be arranged in each of the plurality of grooves of the planar fixator.

In some embodiments, the detection window unit may include a first circular disc for accessing the plurality of detection optical fibers. A plurality of access channels of the plurality of detection optical fibers may be evenly and equidistantly distributed on an outer edge of the first circular disc.

In some embodiments, the fluorescence signal detection unit may include a second circular disc coaxially provided below the first circular disc. The second circular disc may be equipped with a plurality of single excitation light source detection modules. An optical detection focus point of each single excitation light source detection module of the plurality of single excitation light source detection modules may be cooperated with a center of a circle of an access channel accessed to each of the plurality of detection optical fibers on the first circular disc. A driving mechanism may be provided below the second circular disc.

In some embodiments, each of the plurality of single excitation light source detection modules may include a monochromatic light exciter and a light receiver. A first optical path may be provided between the monochromatic light exciter and the optical detection focus point of each of the plurality of single excitation light source detection modules. A second optical path may be provided between the light receiver and the optical detection focus point of each of the plurality of single excitation light source detection modules. The first optical path and the second optical path may be both L-shaped. A dichroic mirror may be provided at a corner of the first optical path. A light reflection sheet may be provided at a corner of the second optical path. The dichroic mirror and the light reflection sheet may be arranged in parallel, and an optical path section from the corner of the first optical path to the optical detection focus point may overlap with an optical path section from the corner of the second optical path to the optical detection focus point.

In some embodiments, the second circular disc may continuously rotate at a speed of 2 Hz-10 Hz.

In some embodiments, the plurality of single excitation light source detection modules may be evenly distributed on an outer edge of the second circular disc. When the second circular disc rotates a circle, the plurality of single excitation light source detection modules may complete a fluorescence signal scanning detection on the plurality of capillary tubes. The plurality of capillary tubes may correspond to the plurality of detection optical fibers of the first circular disc.

In some embodiments, wavelengths of excitation light of any two of the plurality of single excitation light source detection modules may be different.

In some embodiments, a light shielding member may be provided outside the detection window unit and the fluorescence signal detection unit.

One or more embodiments of the present disclosure realize discrete acquisition of multi-channel capillary electrophoresis multi-wavelength fluorescence signals with extremely high sensitivity by optimizing detection of discrete three-dimensional fluorescence conducted by the optical fibers, and completely solve the problem of spatiotemporal spectrum aliasing interference of traditional detection techniques in principle. The optimized discrete three-dimensional fluorescence detection technology can increase the fluorescence acquisition limit by more than one order of magnitude, thus enabling the detection of amplified STR sequence fragments with extremely low abundance, and realizing one-time amplification detection of forty STR loci in a single kit, which greatly improves the accuracy of genetic identification and the reliability of MSI disease diagnosis.

BRIEF DESCRIPTION OF THE DRAWINGS

The present disclosure will be further illustrated by way of exemplary embodiments, which will be described in detail by means of the accompanying drawings. These embodiments are not limiting, and in these embodiments, the same numbering indicates the same structure, wherein.

DETAILED DESCRIPTION

The accompanying drawings to be used in the description of the embodiments will be briefly described below. The accompanying drawings are not intended to represent the entirety of the embodiments.

The terms "system", "device", "unit", and/or "module" are used herein to distinguish between different levels of various components, elements, parts, sections, or assemblies. The terms may be replaced by other expressions if other words achieve the same purpose.

As indicated in the present disclosure and in the claims, unless the context clearly suggests an exception, the words "one," "a," "a kind of," and/or "the" are not exclusively referring to the singular but may also include the plural. In general, the terms "including" and "comprising" suggest only the inclusion of clearly identified steps and elements, which do not constitute an exclusive list, and the method or apparatus may also include other steps or elements.

When describing the operations performed in the embodiments of the present disclosure in terms of steps, the order of the steps is interchangeable unless otherwise indicated, the steps may be omitted, and other steps may be included in the course of the operations.

Figure 1:
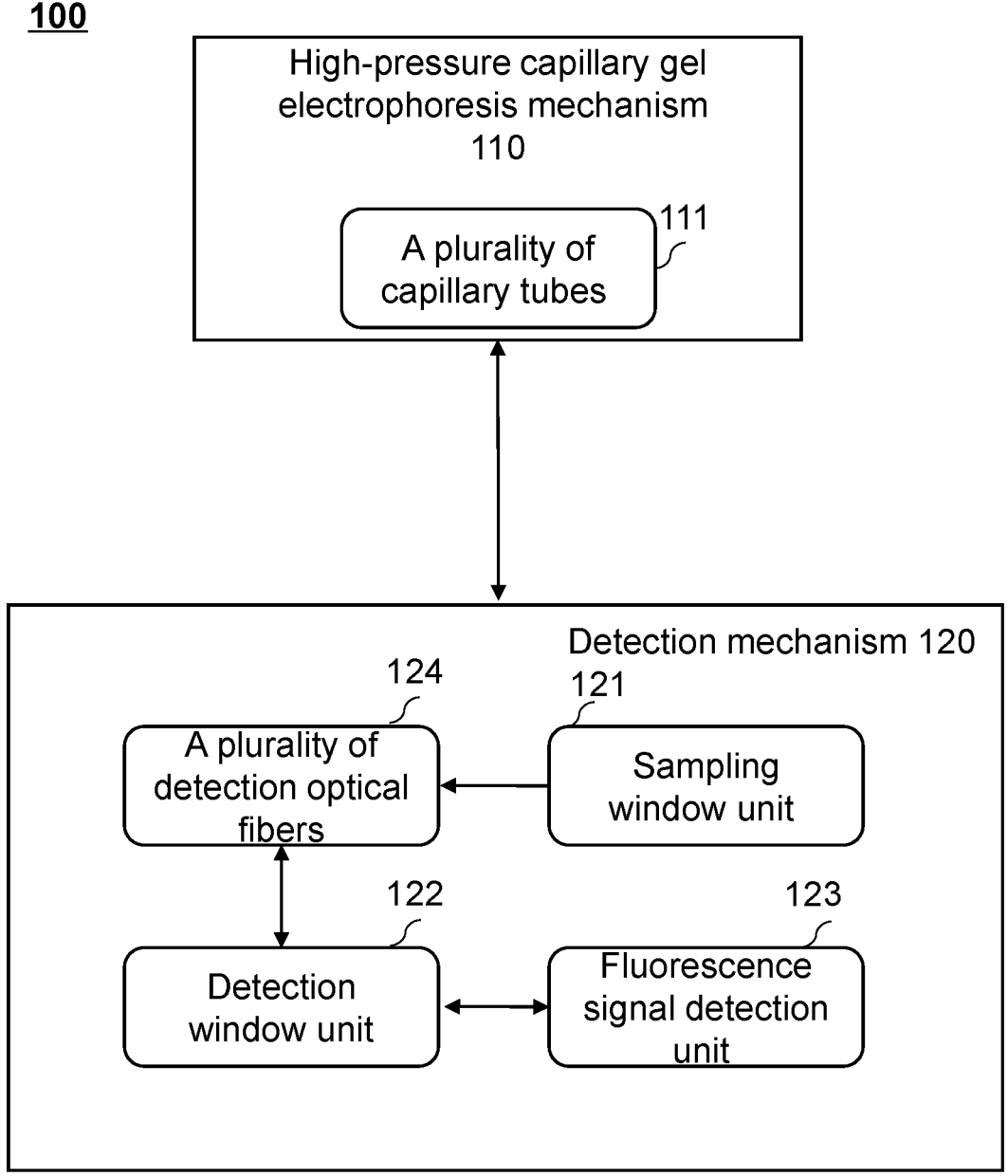
FIG. 1 is a schematic diagram illustrating an exemplary structure of a system for continuous scanning monitoring and analysis based on a discrete three-dimensional fluorescence technology according to some embodiments of the present disclosure.

FIG. 1 is a schematic diagram illustrating an exemplary structure of a system for continuous scanning monitoring and analysis based on a discrete three-dimensional fluorescence technology according to some embodiments of the present disclosure.

In some embodiments, the system 100 for continuous scanning monitoring and analysis based on the discrete three-dimensional fluorescence technology may include a high-pressure capillary gel electrophoresis mechanism 110 and a detection mechanism 120.

The high-pressure capillary gel electrophoresis mechanism 110 refers to a mechanism that is driven by a high-voltage DC power supply and uses a plurality of capillary tube as separation channels to achieve separation of components in a sample based on differences in a mobility (a migration speed per unit electric field strength) and a distribution behavior of the components in the sample.

The high-pressure capillary gel electrophoresis mechanism 110 may include a plurality of capillary tubes 111. The plurality of capillary tubes 111 may be configured to enable passages of different lengths of STR sequence fragments and nucleic acid gene fragments in an energized state. The plurality of capillary tubes 111 may serve as the separation channels to enable separation of different lengths of STR sequence fragments and nucleic acid gene fragments. Lengths of the STR sequence fragments and the nucleic acid gene fragments passing through each of the plurality of capillary tubes may be different.

The detection mechanism 120 may be cooperated with the plurality of capillary tubes 111 and configured to detect the plurality of capillary tubes 111. The detection mechanism 120 may include a sampling window unit 121, a detection window unit 122, a fluorescence signal detection unit 123, and a plurality of detection optical fibers 124.

The sampling window unit 121 may be configured to assemble the plurality of capillary tubes 111 and the plurality of detection optical fibers 124. In some embodiments, the sampling window unit 121 may include fixators for fixing the plurality of capillary tubes 111. In some embodiments, a unique detection optical fiber (e.g., a coaxial detection optical fiber) may be correspondingly provided at a fixed window position of any one of the plurality of capillary tubes 111. In some embodiments, a count of the plurality of capillary tubes 111 may be the same as a count of the plurality of detection optical fibers 124, and each of the plurality of capillary tubes 111 may correspond to each of the plurality of detection optical fibers 124.

The fixed window position of the each of the plurality of capillary tubes refers to predetermined window opening position for detecting a condition inside each of the plurality of capillary tubes. The window opening position of each of the plurality of capillary tubes may be fixed and unchangeable. The fixed window position of each of the plurality of capillary tubes may also be referred to as a detection window of each of the plurality of capillary tubes. The detection optical fiber corresponding to each of the plurality of capillary tubes may be connected with each of the plurality of capillary tubes at the fixed window position of each of the plurality of capillary tubes to detect the condition inside each of the plurality of capillary tubes. For example, information may be obtained by introducing an excitation light source and deriving a fluorescence signal from the excitation.

The plurality of detection optical fibers 124 may be cooperated with the sampling window unit 121 and the detection window unit 122, and the plurality of detection optical fibers 124 may be shared by an excitation light and an excited light. In some embodiments, the plurality of detection optical fibers may be coaxial detection optical fibers.

In some embodiments, the plurality of fixators may include a columnar fixator. The plurality of capillary tubes 111 may be attached to an outer periphery of the columnar fixator along an elongation direction of the columnar fixator. In some embodiments, the columnar fixator may be a cuboid, cylinder, polygonal column, or other columnar structure. The elongation direction of the columnar fixator may be a height direction of the columnar structure. Merely by way of example, if the columnar fixator is the cuboid, the elongation direction of the columnar fixator may be direction indicated by a longest side of the columnar fixator.

Figure 2:
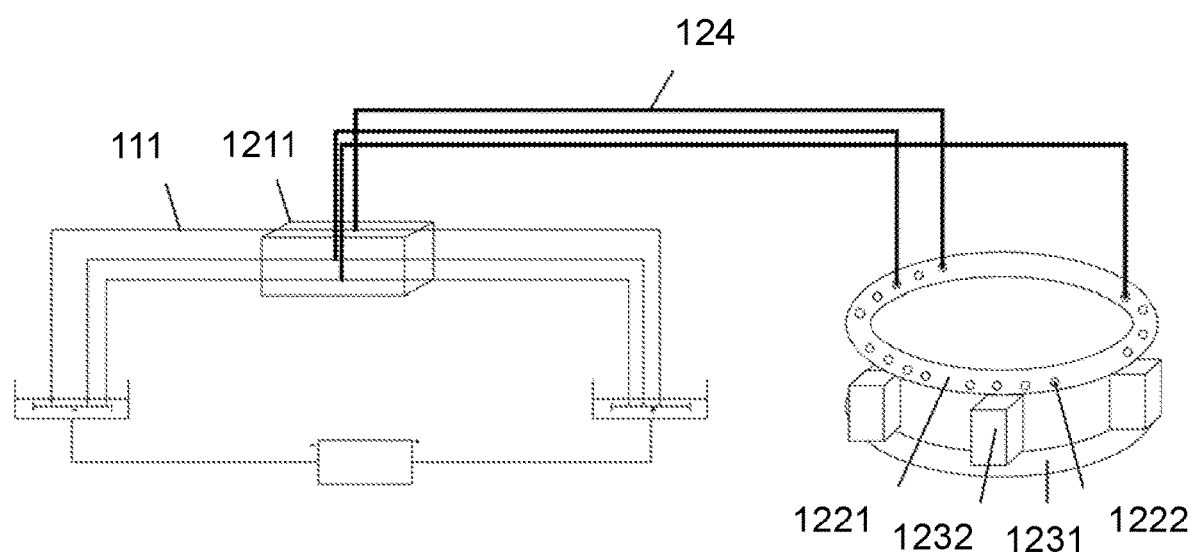
FIG. 2 is a schematic diagram illustrating a structure of a columnar fixator according to some embodiments of the present disclosure.

FIG. 2 is a schematic diagram illustrating a structure of a columnar fixator according to some embodiments of the present disclosure. As illustrated in FIG. 2, when the plurality of fixators include a columnar fixator 1211, each of the plurality of capillary tubes 111 may be fixed along the elongation direction of the columnar fixator 1211. The plurality of capillary tubes 111 may be distributed on a plurality of surfaces of an outer periphery of the columnar fixator 1211, or on a same surface of the columnar fixator 1211.

In some embodiments, each of the plurality of detection optical fibers for exciting and/or receiving a coaxial light conducting signal may be provided on the detection window of any one of the plurality of capillary tubes 111. Each of the plurality of detection optical fibers may simultaneously introduce an excitation light source and conduct an excited fluorescence signal. The detection window of each of the plurality of capillary tubes may be the fixed window opening position connected with each of the plurality of detection optical fibers.

The fluorescence signal refers to a light signal emitted by a substance when the substance is excited. When the substance is in a high energy state, e.g., when the substance is excited by the excitation light source (e.g., ultraviolet light, laser, etc.), electrons of the substance may absorb some energy and transition to an excited state. In this process, the absorbed energy may be rapidly released, forming a specific spectral power distribution, which is the fluorescence signal. Accordingly, the fluorescence signal may provide information related the substance. Different substances may have properties of selectively absorbing excitation lights of different wavelengths, which may affect a wavelength range of the fluorescence signal. In some embodiments of the present disclosure, the fluorescence signal may reflect information related to different lengths of STR sequence fragments and nucleic acid gene fragments passing through the plurality of capillary tubes.

In some embodiments, the plurality of fixators may further include a planar fixator. A plurality of grooves may be provided on the planar fixator. Each of the plurality of capillary tubes 111 may be arranged in each of the plurality of grooves of the planar fixator.

Figure 3:
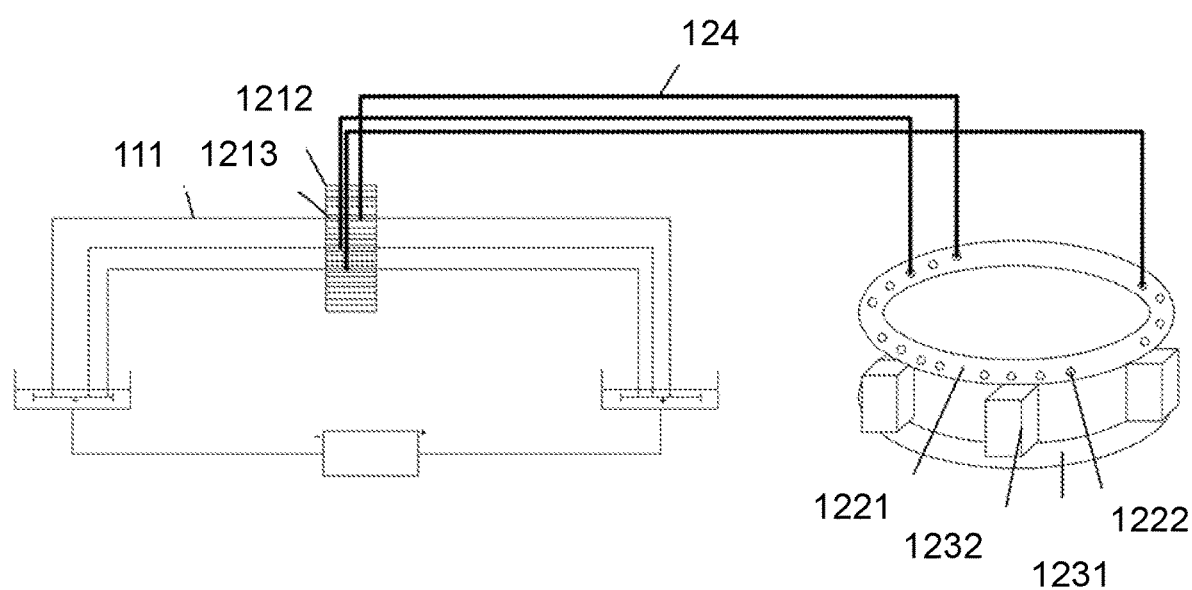
FIG. 3 is a schematic diagram illustrating a structure of a planar fixator according to some embodiments of the present disclosure.

FIG. 3 is a schematic diagram illustrating a structure of a planar fixator according to some embodiments of the present disclosure. As illustrated in FIG. 3, when the plurality of fixators include a planar fixator 1212, a plurality of grooves 1213 may be provided on the planar fixator 1212. Each of the plurality of capillary tubes 111 may be arranged in each of the plurality of grooves 1213.

In some embodiments, the columnar fixator 1211 may perform a same function as the planar fixator 1212, and the columnar fixator 1211 and the planar fixator 1212 may be used separately or in combination. Merely by way of example, the columnar fixator 1211 may be used to separately fix the plurality of capillary tubes 111, while the planar fixator 1212 may be used to position the plurality of capillary tubes 111.

Figure 4:
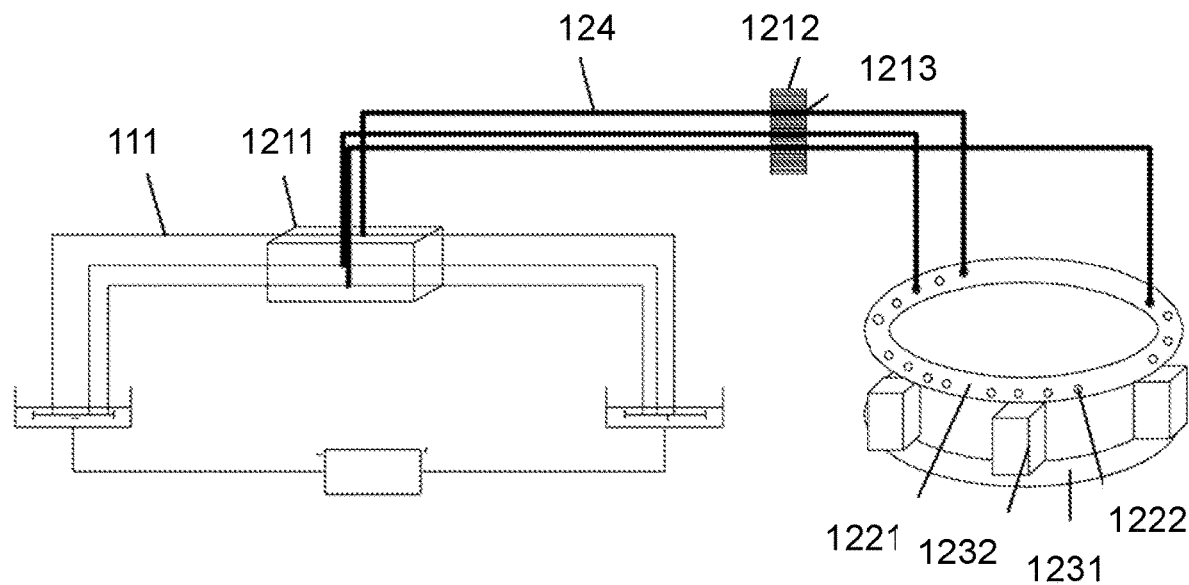
FIG. 4 is a schematic diagram illustrating a structure of a columnar fixator and a planar fixator according to some embodiments of the present disclosure.

FIG. 4 is a schematic diagram illustrating a structure of a columnar fixator and a planar fixator according to some embodiments of the present disclosure. FIG. 4 illustrates a combination use of the columnar fixator 1211 and the planar fixator 1212. The columnar fixator 1211 may be used to separately fix the plurality of capillary tubes 111, while the planar fixator 1212 may be used to fix the plurality of detection optical fibers 124 corresponding to the plurality of capillary tubes 111.

In the embodiments of the present disclosure, the fixation and/or positioning of the plurality of capillary tubes 111 may be implemented by the plurality of fixators, which may avoid affecting detection results caused by position shifting of the plurality of capillary tubes 111. Each of the plurality of fixators may adopt the columnar fixator and/or the planar fixator.

In some embodiments, a light blocking plate may be provided on the fixator between two adjacent capillary tubes. The light blocking plate may be configured to provide a physical separation between the plurality of capillary tubes. In some embodiments, when the columnar fixator 1211 is used, the light blocking plate may be provided outside a column body of the columnar fixator 1211. When the planar fixator 1212 is used, since the planar fixator 1212 is provided with the plurality of grooves 1213, the plurality of grooves 1213 may implement the purpose of blocking the plurality of capillary tubes from each other.

Figure 5:
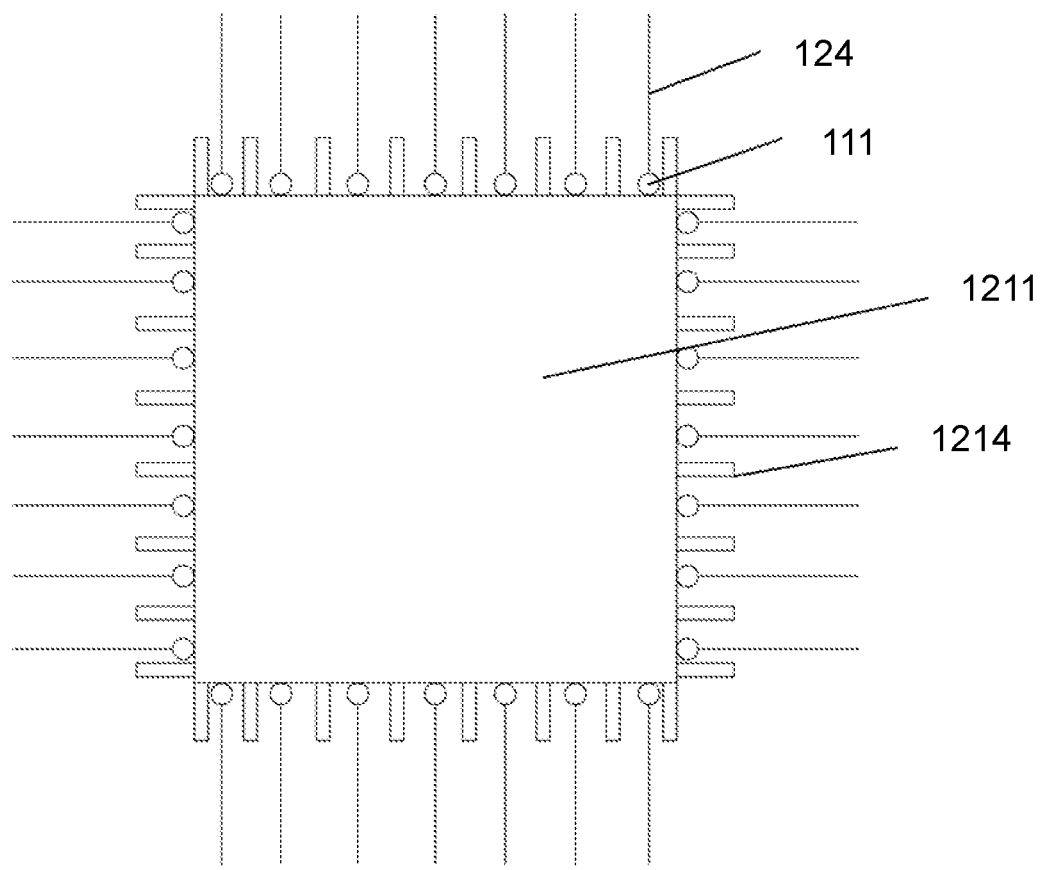
FIG. 5 is a longitudinal sectional view illustrating a columnar fixator according to some embodiments of the present disclosure.

FIG. 5 is a longitudinal sectional view illustrating the columnar fixator 1211 according to some embodiments of the present disclosure. As illustrated in FIG. 5, for the columnar fixator 1211, a light blocking plate 1214 may be provided between the plurality of capillary tubes 111. The plurality of capillary tubes 111 may be connected with the plurality of detection optical fibers 124 at the detection window of the plurality of capillary tubes. The columnar fixator 1211 may be arranged at the detection window of each of the plurality of capillary tubes 111.

In the embodiment of the present disclosure, by providing the light blocking plate between the plurality of capillary tubes, the fluorescence between the channels of the plurality of capillary tubes may not be affected by aliasing interference. A physical separation (e.g., a separation plate) may be provided between the channels of two different capillary tubes, the plurality of detection optical fibers with coaxial excitation and reception may transmit the fluorescence to the first circular disc (see the subsequent description of the detection window unit 122), and the excitation light sources of the plurality of single excitation light source detection modules (see the subsequent description of the fluorescence signal detection unit 123) may poll each of the plurality of detection optical fibers on a circumference of the first circular disc, so that excitation intensities of the excitation light sources may keep constant, and the fluorescence of different channels may be guaranteed against aliasing interference due to physical separation, thereby achieving spatial acquisition of the discrete fluorescence signals.

The detection window unit 122 may be configured to assemble the plurality of detection optical fibers 124 and the fluorescence signal detection unit 123.

In some embodiments, the detection window unit 122 may include the first circular disc for accessing the plurality of detection optical fibers 124. A plurality of access channels of the plurality of detection optical fibers 124 may be evenly and equidistantly distributed on an outer edge of the first circular disc.

The first circular disc may be configured to connect the plurality of detection optical fibers 124 with the fluorescence signal detection unit 123. As illustrated in FIGS. 2-4, one end of each of the plurality of detection optical fibers 124 may be fixed at the detection window of each of the plurality of capillary tubes 111, another end of each of the plurality of detection optical fibers 124 may be fixed on the circumference (e.g., the outer edge) of the first circular disc 1221 through each of the plurality of access channels 1222. Each access channel 1222 of each of the plurality of detection optical fibers 124 may be evenly and equidistantly distributed. In some embodiments, a count of the plurality of detection optical fibers 124 may be the same as a count of the plurality of access channels 1222. The count of the plurality of access channels 1222 may also be greater than the count of the plurality of detection optical fibers 124.

In some embodiments, each of the plurality of capillary tubes 111, each of the plurality of detection optical fibers 124, and each of the plurality of access channels 1222 may correspond, and the count of the plurality of capillary tubes 111, the count of the plurality of detection optical fibers 124, and the count of the plurality of access channels 1222 may be the same. Merely by way of example, the STR sequence fragments and the nucleic acid gene fragments passing through one of the plurality of capillary tubes may be detected by the detection optical fiber corresponding to the capillary tube, the access channel corresponding to the capillary tube, and the single excitation light source detection module corresponding to the capillary tube. Different lengths of STR sequence fragments and nucleic acid gene fragments may be separated by the plurality of capillary tubes 111, and thus different lengths of STR sequence fragments and nucleic acid gene fragments may be detected separately.

The fluorescence signal detection unit 123 may be configured to output a plurality of single excitation light sources and obtain fluorescence signals.

In some embodiments, as illustrated in FIGS. 2-4, the fluorescence signal detection unit 123 may include a second circular disc 1231 coaxially disposed under the first circular disc 1221. The second circular disc 1231 may be equipped with a plurality of single excitation light source detection modules 1232. The second circular disc 1231 may be configured to connect the first circular disc with the plurality of single excitation light source detection modules 1232. The plurality of single excitation light source detection modules 1232 may be configured to emit excitation lights and receive excited fluorescence signals.

In some embodiments, an optical detection focus point of each of the plurality of single excitation light source detection modules 1232 may be cooperated with a center of a circle of each of the plurality of access channels 1222 accessed to each of the plurality of detection optical fibers 124 on the first circular disc 1221, so that the emitted excitation lights and the received fluorescence signals may be transmitted through the plurality of detection optical fibers 124 corresponding to the plurality of access channels 1222. The optical detection focus point of each of the plurality of single excitation light source detection modules refers to a focus point of the excitation light emitted by each of the plurality of single excitation light source detection modules. Focused excitation lights may be transmitted through the plurality of detection optical fibers 124.

When the detection is performed, the excitation lights emitted by the plurality of single excitation light source detection modules 1232 may be focused at their respective optical detection focus points and conducted into the plurality of detection optical fibers 124 through the plurality of access channels 1222, and then conducted into the plurality of capillary tubes 111. The excited fluorescence signals in the plurality of capillary tubes 111 may be exported through the plurality of detection optical fibers 124 and then transmitted to the plurality of single excitation light source detection modules 1232 through the plurality of access channels 1222 and the corresponding optical detection points.

Figure 6:
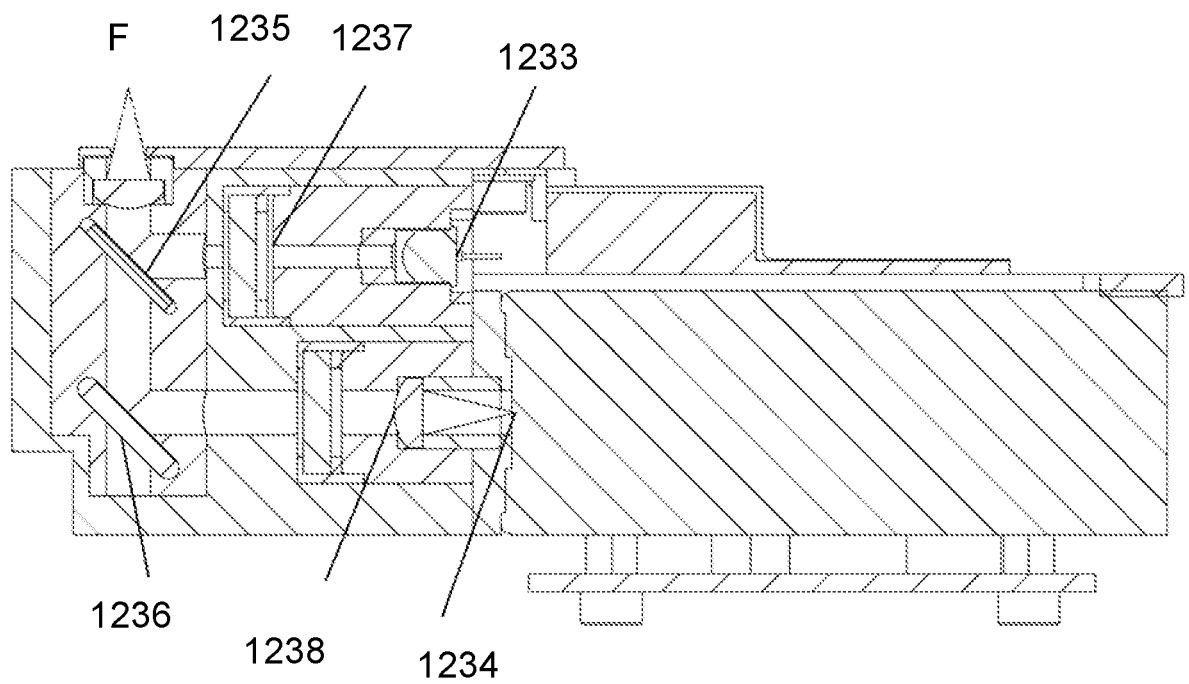
FIG. 6 is a schematic diagram illustrating a structure of a single excitation light source detection module according to some embodiments of the present disclosure.

FIG. 6 is a schematic diagram illustrating a structure of a single excitation light source detection module according to some embodiments of the present disclosure. In some embodiments, as illustrated in FIG. 6, each of a plurality of single excitation light source detection modules may include a monochromatic light exciter 1233 and a light receiver 1234. The monochromatic light exciter 1233 may be configured to emit a monochromatic laser light. The light receiver 1234 may be configured to receive an excited fluorescence signal.

In some embodiments, the light receiver 1234 may include a detection sensor, such as a highly sensitive photomultiplier tube (PMT), a silicon photomultiplier tube (SiPM), or an avalanche diode (ADP), a photodiode (PD), or the like.

In some embodiments, a first optical path may be provided between the monochromatic light exciter 1333 corresponding to each of the plurality of single excitation light source detection modules and an optical detection focus point F of the single excitation light source detection module, and a second optical path may be provided between the light receiver 1234 corresponding to each of the plurality of single excitation light source detection modules and the optical detection focus point of the single excitation light source detection module.

In some embodiments, both the first optical path and the second optical path may be L-shaped. The monochromatic laser light emitted by the monochromatic light exciter 1233 may be focused at the optical detection focus point F through the first optical path, and conducted to each of the plurality of capillary tubes through each of the plurality of access channels and each of the plurality of detection optical fibers. The excited fluorescence signal in each of the plurality of capillary tubes may be exported through each of the plurality of detection optical fibers and then received by the light receiver 1234 through each of the plurality of access channel, the optical detection focus point F, and the second optical path.

In some embodiments, a dichroic mirror 1235 may be provided at a corner of the first optical path, and a light reflection sheet 1236 may be provided at a corner of the second optical path.

The dichroic mirror 1235 refers to an instrument that produces the phenomenon of transmission or reflection depending on a difference in wavelengths. The light reflection sheet 1236 refers to an instrument through which a light beam irradiates to a surface to form a specular reflection. Coaxial conjugation of excitation and reception may be achieved by the dichroic mirror 1235.

In some embodiments, the dichroic mirror 1235 and the light reflection sheet 1236 may be provided in parallel and the first optical path and the second optical path may partially overlap. In some embodiments, an optical path section from the corner of the first optical path to the optical detection focus point F may overlap with an optical path section from the corner of the second optical path to the optical detection focus point F. That is, an optical path section from the dichroic mirror 1235 to the optical detection focus point F may overlap with an optical path section from the light reflection sheet 1236 to the optical detection focus point F.

In some embodiments, an angle of incidence of the dichroic mirror 1235 and the light reflection sheet 1236 may be 45°.

Merely by way of example, the monochromatic laser light emitted by the monochromatic light exciter 1233 may be focused at the optical detection focus point F through reflection of the dichroic mirror 1235, and then conducted into the plurality of capillary tubes through the plurality of detection optical fibers. The excited fluorescence signals in the plurality of capillary tubes may be exported to the optical detection focus point F through the plurality of detection optical fibers, and further transmitted to the light receiver 1234 through the second optical path. When the fluorescence signals reach the dichroic mirror 1235 through an overlapping optical path section, the fluorescence signals may not be reflected to the monochromatic light exciter 1233 by the dichroic mirror 1235, but pass through the dichroic mirror 1235 to reach the light reflection sheet 1236, which may be then reflected to the light receiver 1234.

In the embodiments of the present disclosure, the plurality of single excitation light source detection modules may adopt a filtering technology of mutually perpendicular polarizers, which can eliminate the interference of the strong light background of the excitation light sources on the detection results. In addition, the detection sensor may adopt a high-sensitivity photomultiplier tube, or the like, making the detection sensitivities of the plurality of single excitation light source detection modules far superior to that of a traditional CCD acquisition scheme.

In some embodiments, each of the plurality of single excitation light source detection modules may further include a front adjustment component 1237 and a rear adjustment component 1238. The excitation light emitted by the monochromatic light exciter 1233 may pass through the front adjustment component 1237 and then irradiate onto the dichroic mirror 1235. The excitation light may be reflected and focused onto the access channel of the detection optical fiber corresponding to the single excitation light source detection module of the first circular disc 1221 at a current moment. A returned fluorescence signal may enter a receiving channel of the light receiver 1234 through transmission of the dichroic mirror 1235, pass through the light reflection sheet 1236, and then focus on the light receiver 1234 after passing through the rear adjustment component 1238, thereby completing the detection of the fluorescence signal. The front adjustment assembly 1237 may be configured to adjust an emission angle of the excitation light and select a specific excitation light. The rear adjustment component 1238 may be configured to adjust an emission degree of the returned fluorescence signal. In some embodiments, the front adjustment component 1237 may include a collimating mirror and an excitation filter, and the rear adjustment component 1238 may include a lens set. The collimating mirror may be configured to collimate the excitation light emitted by the monochromatic light exciter 1233, i.e., change a diverging light into a parallel light. The excitation filter enables selective transmission of a specific wavelength of excitation light. The lens set may focus or diverge the returned fluorescence signal.

In some embodiments, a drive mechanism (not shown in the figures) may be further provided under the second circular disc 1231. The drive mechanism may be configured to drive the second circular disc 1231 to rotate. For example, the drive mechanism may include a drive motor. In some embodiments, the second circular disc 1231 may rotate continuously at a speed of 2 Hz-10 Hz.

In some embodiments, the plurality of single excitation light source detection modules 1232 may be evenly distributed on the outer edge of the second circular disc 1231. When the second circular disc 1231 rotates a circle, the plurality of single excitation light source detection modules 1232 may complete a fluorescence signal scanning detection on the plurality of capillary tubes 111. The plurality of capillary tubes 111 may correspond to the plurality of detection optical fibers 124 connected with the first circular disc 1221.

In some embodiments, wavelengths of the excitation lights emitted from any two of the plurality of single excitation light source detection modules may be different. Therefore, different single excitation light source detection modules may emit different colors of excitation lights for detection, thereby obtaining different fluorescence signals. When the second circular disc 1231 rotates a circle, each of the plurality of single excitation light source detection modules may complete the fluorescence signal scanning detection on each of the plurality of capillary tubes 111 corresponding to the plurality of detection optical fibers 124 at different times. Furthermore, each of the plurality of capillary tubes 111 corresponding to the plurality of detection optical fibers 124 may be detected multiple times by the plurality of single excitation light source detection modules emitting different wavelengths of excitation lights. In some embodiments, a count of the plurality of single excitation light source detection modules 1232 may be the same as a count of times each of the plurality of capillary tubes 111 that needs to be detected.

In the embodiments of the present disclosure, one end of each of the plurality of detection optical fibers 124 may be evenly and equidistantly fixed on the circumference of the first circular disc 1221, the plurality of single excitation light source detection modules 1232 may be equidistantly distributed on the second circular disc 1231, and each of the plurality of single excitation light source detection modules may be used for targeting a characteristic excitation wavelength and a receiving wavelength of a fluorescent dye. By continuously rotating the second circular disc 1231 at a specific speed for monitoring, each capillary tube of each channel may achieve high-speed "continuous" monitoring of multiple discrete acquisitions of three-dimensional fluorescence through multiple wavelengths of excitation lights.

Each fluorescent dye for labeling the STR sequences and the gene fragments may have an excitation light source of a specific wavelength and a filter of a specific receiving wavelength, ensuring that a received signal is fluorescence at a target specific wavelength while efficiently exciting the fluorescence. In the embodiments of the present disclosure, the detection of each of the plurality of single excitation light source detection modules may be polled by a time slice, i.e., time division. The plurality of single excitation light source detection modules may detect the plurality of capillary tubes corresponding to different detection optical fibers in different time slices, thereby realizing discrete acquisition in time and avoiding the aliasing interference of multi-fluorescence. The fluorescence signals of different time slices in a polling cycle may form a 3D fluorescence spectral signal.

In some embodiments, a light shielding member (not shown in the figures) may be provided outside the detection window unit 122 and the fluorescence signal detection unit 123 to avoid interference to the detection from other light sources.

In the embodiments of the present disclosure, the operation of the high-pressure capillary gel electrophoresis mechanism may follow the principle of high-voltage capillary tube gel electrophoresis. In other words, a high-voltage power supply may be driven by an external force in the energized state, different lengths of STR sequences or nucleic acid gene fragments may through towards an anode the plurality of capillary tubes 111. The sampling window unit 121 of the detection mechanism 120 may be configured to assembly the plurality of capillary tubes 111. In a movement process of the STR sequences, the fluorescence signal detection unit 123 of the detection mechanism 120 may emit the excitation lights from the plurality of detection optical fibers 124 to the plurality of capillary tubes 111, and transmit back signals of the excitation lights through the plurality of detection optical fibers 124 for detection. The adjacent capillary tubes may be separated, thereby achieving spatial discrete acquisition of the multi-channel fluorescence signals.

In the embodiments of the present disclosure, the system 100 for continuous scanning monitoring and analysis based on the discrete three-dimensional fluorescence technology may be a fully automated DNA sequencer that integrates automated perfusion, automated sampling, and automated data collection and analysis. After the samples are subjected to PCR amplification and gel electrophoresis separation by the plurality of capillary tubes 111, high-precision identification of the DNA fragments of a plurality (e.g., 40) of STR loci may be performed using the plurality of single excitation light source detection modules. The STR genotypes may be further intelligently analyzed based on the signal acquisition time and fluorescence bands, so that high-speed, accurate, and reliable analysis of the plurality of samples may be performed, thereby obtaining precise genetic identity fingerprint information of the plurality of samples and MSI disease diagnosis information.

The basic concept has been described above. Obviously, for those skilled in the art, the above detailed disclosure is only an example, and does not constitute a limitation to the present disclosure. Although not expressly stated here, those skilled in the art may make various modifications, improvements and corrections to the present disclosure. Such modifications, improvements and corrections are suggested in this disclosure, so such modifications, improvements and corrections still belong to the spirit and scope of the exemplary embodiments of the present disclosure.

Meanwhile, the present disclosure uses specific words to describe the embodiments of the present disclosure. For example, "one embodiment", "an embodiment", and/or "some embodiments" refer to a certain feature, structure or characteristic related to at least one embodiment of the present disclosure. Therefore, it should be emphasized and noted that references to "one embodiment" or "an embodiment" or "an alternative embodiment" two or more times in different places in the present disclosure do not necessarily refer to the same embodiment. In addition, certain features, structures or characteristics in one or more embodiments of the present disclosure may be properly combined.

In addition, unless clearly stated in the claims, the sequence of processing elements and sequences described in the present disclosure, the use of counts and letters, or the use of other names are not used to limit the sequence of processes and methods in the present disclosure. While the foregoing disclosure has discussed by way of various examples some embodiments of the invention that are presently believed to be useful, it should be understood that such detail is for illustrative purposes only and that the appended claims are not limited to the disclosed embodiments, but rather, the claims are intended to cover all modifications and equivalent combinations that fall within the spirit and scope of the embodiments of the present disclosure. For example, although the implementation of various components described above may be embodied in a hardware device, it may also be implemented as a software only solution, e.g., an installation on an existing server or mobile device.

In the same way, it should be noted that in order to simplify the expression disclosed in this disclosure and help the understanding of one or more embodiments of the invention, in the foregoing description of the embodiments of the present disclosure, sometimes multiple features are combined into one embodiment, drawings or descriptions thereof. This method of disclosure does not, however, imply that the subject matter of the disclosure requires more features than are recited in the claims. Rather, claimed subject matter may lie in less than all features of a single foregoing disclosed embodiment.

In some embodiments, counts describing the quantity of components and attributes are used. It should be understood that such counts used in the description of the embodiments use the modifiers "about", "approximately" or "substantially" in some examples. Unless otherwise stated, "about", "approximately" or "substantially" indicates that the stated figure allows for a variation of ±20%. Accordingly, in some embodiments, the numerical parameters used in the disclosure and claims are approximations that can vary depending upon the desired characteristics of individual embodiments. In some embodiments, numerical parameters should consider the specified significant digits and adopt the general digit retention method. Although the numerical ranges and parameters used in some embodiments of the present disclosure to confirm the breadth of the range are approximations, in specific embodiments, such numerical values are set as precisely as practicable.

Each of the patents, patent applications, publications of patent applications, and other material, such as articles, books, specifications, publications, documents, things, and/ or the like, referenced herein is hereby incorporated herein by this reference in its entirety for all purposes, excepting any prosecution file history associated with same, any of same that is inconsistent with or in conflict with the present document, or any of same that may have a limiting affect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the application disclosed herein are illustrative of the principles of the embodiments of the application. Other modifications that may be employed may be within the scope of the application. Thus, by way of example, but not of limitation, alternative configurations of the embodiments of the application may be utilized in accordance with the teachings herein. Accordingly, embodiments of the present application are not limited to that precisely as shown and described.

What is claimed is:

1. A system for continuous scanning monitoring and analysis based on discrete three-dimensional fluorescence technology, comprising:
   a high-pressure capillary gel electrophoresis mechanism including a plurality of capillary tubes, the plurality of capillary tubes configured to enable passages of different lengths of STR sequence fragments and nucleic acid gene fragments in an energized state;
   a detection mechanism configured to be cooperated with the plurality of capillary tubes, including:
   a sampling window unit configured to assemble the plurality of capillary tubes and a plurality of detection optical fibers; wherein the sampling window unit includes fixators for fixing the plurality of capillary tubes, and a unique detection optical fiber correspondingly provided at a fixed window position of any one of the plurality of capillary tubes; and a light blocking plate is provided on the fixator between two adjacent capillary tubes;
   a detection window unit configured to assemble the plurality of detection optical fibers and a fluorescence signal detection unit; wherein the detection window unit includes a first circular disc for accessing the plurality of detection optical fibers, and a plurality of access channels of the plurality of detection optical fibers are evenly and equidistantly distributed on an outer edge of the first circular disc;
   the fluorescence signal detection unit configured to output a plurality of single excitation light sources and obtain fluorescence signals; wherein the fluorescence signal detection unit includes a second circular disc coaxially provided below the first circular disc, the second circular disc is equipped with a plurality of single excitation light source detection modules, an optical detection focus point of each single excitation light source detection module of the plurality of single excitation light source detection modules is cooperated with a center of a circle of an access channel accessed to each of the plurality of detection optical fibers on the first circular disc; a driving mechanism is provided below the second circular disc; and wavelengths of excitation light of any two of the plurality of single excitation light source detection modules are different; and
   the plurality of detection optical fibers configured to be cooperated with the sampling window unit and the detection window unit, wherein the plurality of detection optical fibers are shared by the excitation light and an excited light.

2. The system of claim 1, wherein each of the plurality of fixators includes a columnar fixator, and the plurality of capillary tubes are attached to an outer periphery of the columnar fixator along an elongation direction of the columnar fixator.

3. The system of claim 1, wherein each of the plurality of fixators further includes a planar fixator, a plurality of grooves are provided on the planar fixator, and each of the plurality of capillary tubes is arranged in each of the plurality of grooves of the planar fixator.

4. The system of claim 1, wherein each of the plurality of single excitation light source detection modules includes a monochromatic light exciter and a light receiver, a first optical path is provided between the monochromatic light exciter and the optical detection focus point of each of the plurality of single excitation light source detection modules, a second optical path is provided between the light receiver and the optical detection focus point of each of the plurality of single excitation light source detection modules, the first optical path and the second optical path are both L-shaped, a dichroic mirror is provided at a corner of the first optical path, a light reflection sheet is provided at a corner of the second optical path, the dichroic mirror and the light reflection sheet are arranged in parallel, and an optical path section from the corner of the first optical path to the optical detection focus point overlaps with an optical path section from the corner of the second optical path to the optical detection focus point.

5. The system of claim 1, wherein the second circular disc continuously rotates at a speed of 2 Hz-10 Hz.

6. The system of claim 1, wherein the plurality of single excitation light source detection modules are evenly distributed on an outer edge of the second circular disc, and when the second circular disc rotates a circle, the plurality of single excitation light source detection modules completes a fluorescence signal scanning detection on the plurality of capillary tubes, the plurality of capillary tubes corresponding to the plurality of detection optical fibers of the first circular disc.

7. The system of claim 1, wherein a light shielding member is provided outside the detection window unit and the fluorescence signal detection unit.

* * * * *